United States Patent
Bigolin

[11] Patent Number: 6,136,426
[45] Date of Patent: Oct. 24, 2000

[54] INTEGRAL ELASTIC SUPPORT STRUCTURE WITH ORNAMENTAL ELEMENTS AND METHOD FOR MANUFACTURING SUCH STRUCTURE

[75] Inventor: Riccardo Bigolin, San Zenone Degli Ezzelini, Italy

[73] Assignee: Selle Royal SPA, Pozzoleone, Italy

[21] Appl. No.: 09/087,975

[22] Filed: Jun. 1, 1998

[30] Foreign Application Priority Data

Sep. 19, 1997 [IT] Italy ................................. VI97A0160

[51] Int. Cl.[7] .............................. B32B 5/18; B32B 27/04; B32B 27/40; B29C 5/18
[52] U.S. Cl. .................... 428/319.3; 264/46.5; 264/46.6; 264/271.1; 428/67; 428/71; 428/304.4; 428/323; 428/542.6
[58] Field of Search .................... 428/29, 67, 71, 428/304.4, 323, 542.6, 319.3; 264/46.5, 271.1, 46.6

[56] References Cited

U.S. PATENT DOCUMENTS

| | | | |
|---|---|---|---|
| 3,438,828 | 4/1969 | Pellicer et al. | 428/67 X |
| 3,518,146 | 6/1970 | Plympton | 428/323 X |
| 4,214,028 | 7/1980 | Shortway et al. | 428/319.3 X |
| 4,404,296 | 9/1983 | Schäpel | 523/105 |
| 4,456,642 | 6/1984 | Burgdörfer | 428/68 |
| 4,767,647 | 8/1988 | Bree | 428/67 X |
| 4,808,469 | 2/1989 | Hiles | 428/319.3 X |
| 4,863,782 | 9/1989 | Wang et al. | 428/304.4 X |
| 4,916,007 | 4/1990 | Manning et al. | 428/323 X |
| 4,999,068 | 3/1991 | Chiarella | 156/78 |
| 5,445,858 | 8/1995 | Nwoko | 428/319.3 X |
| 5,525,290 | 6/1996 | Carpenter | 264/271.1 X |
| 5,670,232 | 9/1997 | Bigolin | 428/71 |
| 5,702,806 | 12/1997 | O'Dell et al. | 428/323 X |
| 5,785,909 | 7/1998 | Chang et al. | 264/46.5 |
| 5,827,459 | 10/1998 | Allen et al. | 264/46.5 X |

*Primary Examiner*—Richard D. Lovering
*Attorney, Agent, or Firm*—Dykema Gossett PLLC

[57] ABSTRACT

An integral elastic support structure (1) comprising a filler (3) in elastically yielding material covered by a covering layer (4) in flexible laminar material. The filler (3) has in its inside at least one ornamental element (5) and the covering layer (4) has at least one optically transparent zone (7) through which the cited ornamental element is visible. The covering layer (4) may be formed by a sheet of uniformly transparent synthetic material which is opacified in the zone which is complementary to the optically transparent zone. A method for the manufacture of the cited elastic support provides for the insertion in the filler (3) of at least one ornamental element (5) and the provision on the covering layer (4) of at least one optically transparent zone (7) through which the ornamental element (5) is visible. The integral elastic element obtained in this manner is comfortable, allows to verify the presence of the filler layer in gel, has ornamental elements which are not subjected to damage or wear.

25 Claims, 4 Drawing Sheets

INTEGRAL ELASTIC SUPPORT STRUCTURE WITH ORNAMENTAL ELEMENTS AND METHOD FOR MANUFACTURING SUCH STRUCTURE

TECHNICAL FIELD

The present invention relates to an integral elastic support structure with ornamental elements, and to a method for manufacturing such support structure.

BACKGROUND ART

Some non-limiting examples of elastic supports of the above-cited type are constituted by cushions, seats, seat backs, arm rests, chair paddings, sofas and other furniture, mattresses, patient's supports, bicycle and motorcycle seats, glove and shoe paddings, such as innersoles, insoles and malleolar pads, knee pads, elbow pads, protective inserts for overalls\suits and similar items.

From the Italian patent IT-A-1 270 728 in the name of the same applicant there is known an integral elastic support comprising a filler in elastically yielding material covered by an external covering layer in flexible laminar material. The filler is formed by a layer of expanded resin to which a layer of a gel compound is overlaid and chemically bound, located in zones which are subjected to the maximum pressure on the part of the user, for example in proximity to the ischiatic bones. The external covering layer may be provided as a natural or synthetic material, for example as a multilayer formed by a fabric impregnated by PVC and covered by a film of polyurethane resin.

It is known that the use of a gel compound for providing a filler layer confers an increased comfort with respect to the layers of traditional material and increases the quality of the product even if at increased costs for the user.

Unfortunately, this characteristic, which constitutes an attraction to the clientele, is often the object of misleading advertising on the part of manufacturers without scruples who claim the use of the gel compound but who in fact introduce other materials below the covering of the support so as to impede the consumer from carrying out a control. The requirement therefore arises to provide consumers with a direct proof of the actual use of compound gel in the event that its presence is claimed by the manufacturer.

A further problem is constituted by the fact that, for ornamental or advertising requirements, it is often necessary to apply designs, writings or trademarks of various kinds and colourings to the external surface of the covering. In some cases there may be asked for a personalisation of such writings or ornamental elements in order to satisfy the requirements of the clientele.

A drawback of such known supports is that the cited ornamental elements are generally serigraphed, printed, or applied to the external surface of the covering and therefore may be subjected to deterioration due to the rubbing on the part of the user or due to the effects of atmospheric agents.

Moreover, the aesthetic effect obtained with the traditional serigraphy or offset systems is rather ordinary and does not allow to effectively differentiate or personalise the products present on the market.

Some attempts to apply two-dimensional or three-dimensional, and rigid or semirigid, ornamental elements on the external surface of the supports have not had success in that they have demonstrated reduction in comfort for the user.

In conclusion, up until today there is lacking an identification and ornamental system which is truly innovative.

DISCLOSURE OF THE INVENTION

One general aim of the present invention is to obviate the above described drawbacks by providing an integral elastic support with characteristics of extreme comfort and with extremely stable and lasting ornamental elements which are not subjected to deterioration or wear.

A further aim of the present invention is to provide an elastic support which allows to directly verify the presence of a gel compound in the filler layer without having to proceed with the demolition or with the damaging of the support under examination.

Another aim is to provide an elastic support having ornamental elements with a great visibility, originality, and effectiveness.

It is still another aim to conceive a method of manufacturing integral elastic supports with ornamental elements, as above indicated, which is effective and relatively inexpensive. These and other aims which appear more clearly hereinafter are accomplished by an integral elastic support with ornamental elements comprising a filler in elastically yielding material covered by a covering layer in flexible laminar material, which is characterised by the fact that the filler incorporates at least one ornamental element and by the fact that the covering layer has at least one optically transparent zone through which at least one ornamental element is visible.

Due to this structure, the ornamental element is visible but it is covered by the filler layer, protecting it from wear and from atmospheric agents and conferring an elevated aesthetic quality to the finished product.

Advantageously, the filler comprises at least one first layer of a uniformly transparent compound gel completely covered by the covering layer.

According to another aspect of the invention, there is provided a method for the manufacture of an integral elastic support with ornamental elements of the type comprising a filler in elastically yielding material covered by a covering layer in flexible laminar material, characterised by the fact of inserting inside the filler at least one ornamental element and of providing on the covering layer at least one optically transparent zone through which said at least one ornamental element is visible.

Preferably, the method comprises the steps of the predisposing of a tool formed by a lower female mould having an upwardly open cavity reproducing the surface of the support destined for contact with the user and by an upper closure plate, the positioning on the bottom of the female mould of a sheet of impermeable flexible laminar material defining a covering layer, the preforming of the covering layer in a manner to reproduce the bottom of said cavity, the pouring on the bottom of the preformed covering layer of a gel compound defining a first filler layer, the pouring on the partially polymerised gel compound of a second filler layer of expandable resin in the fluid state, the hermetic closure of the female mould with the upper plate in order to allow the expansion and the complete polymerisation of the resin and of the gel compound. The method is characterised by the fact that said gel compound is previously dehumidified and de-aerated in a manner to be completely transparent, and furthermore that said at least one ornamental element is positioned on the first layer before the pouring of the second filler layer in a position which is substantially aligned with the at least one optically transparent zone of the covering layer.

BRIEF DESCRIPTION OF DRAWINGS

A of the particular characteristics and advantages of the invention will become more apparent in light of the following detailed description of some preferred but not exclusive embodiments of an integral elastic support structure with ornamental elements, and of a method for manufacturing such structure, in accordance with the invention, illustrated with the help of the attached drawing sheets in which.

DETAILED DESCRIPTION OF THE INVENTION

Figure 1:
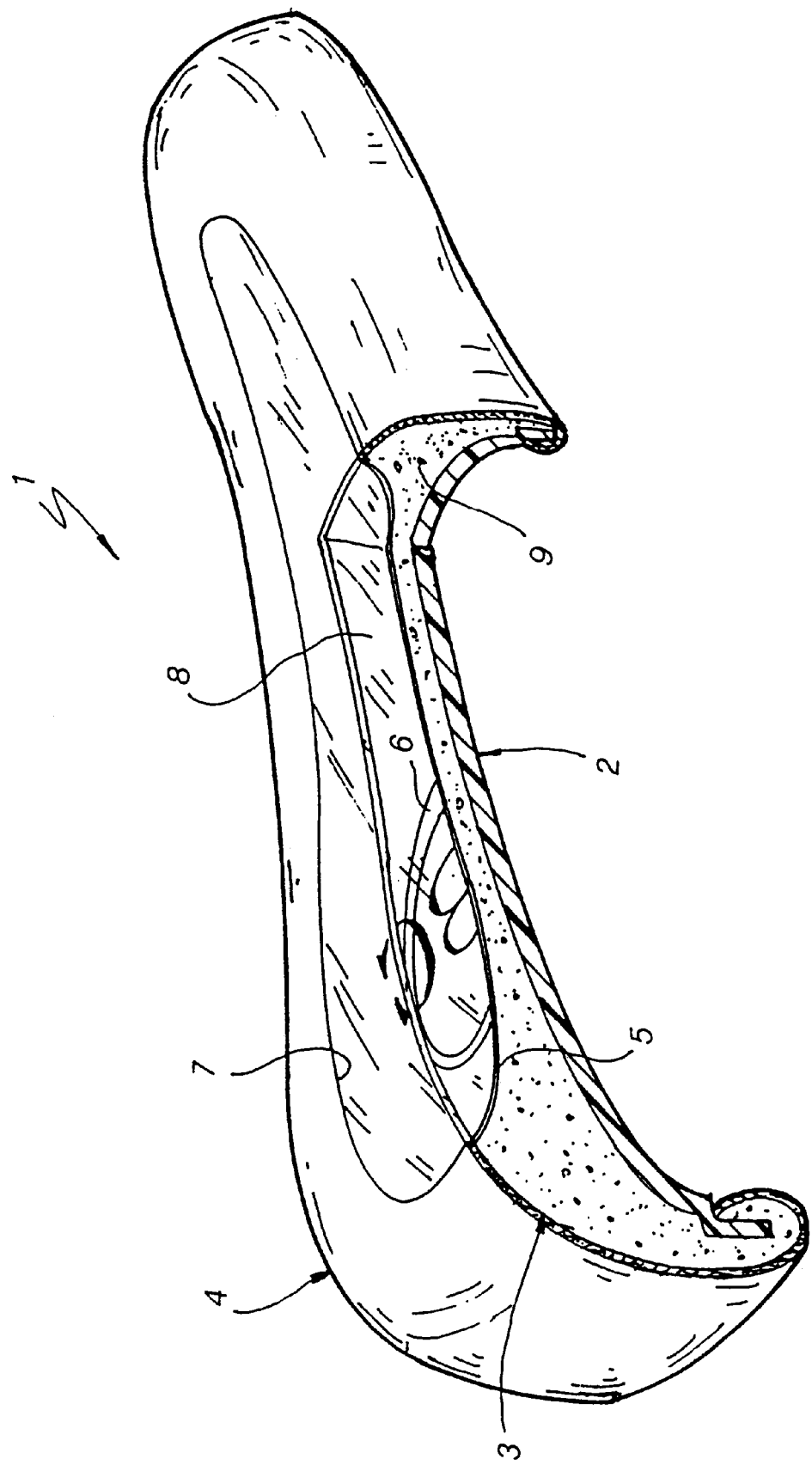
FIG. 1 illustrates a partially sectioned perspective view of an integral support according to one preferred aspect of the invention.
Figure 2:
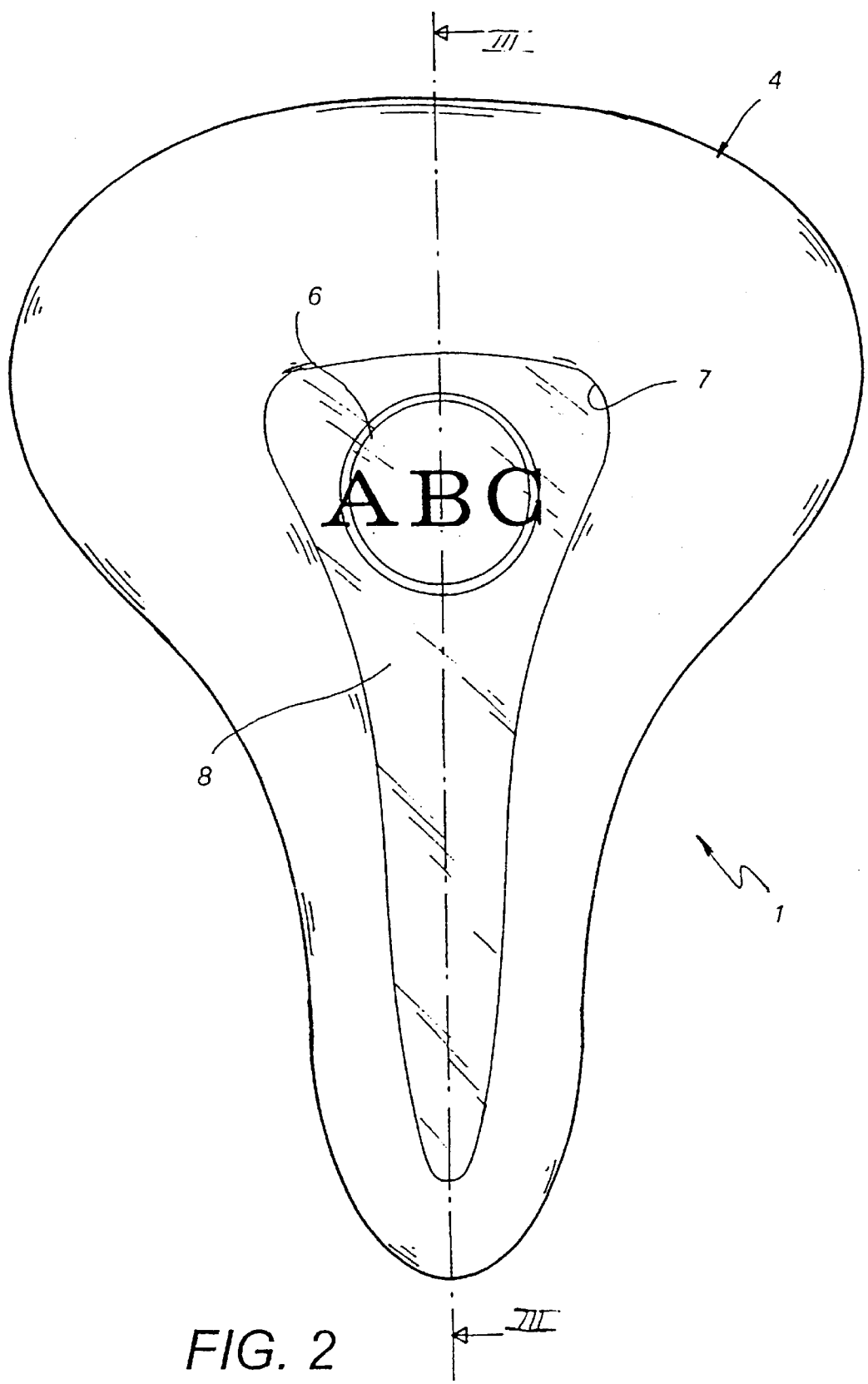
FIG. 2 illustrates an upper plan view of the support of FIG. 1.
Figure 3:
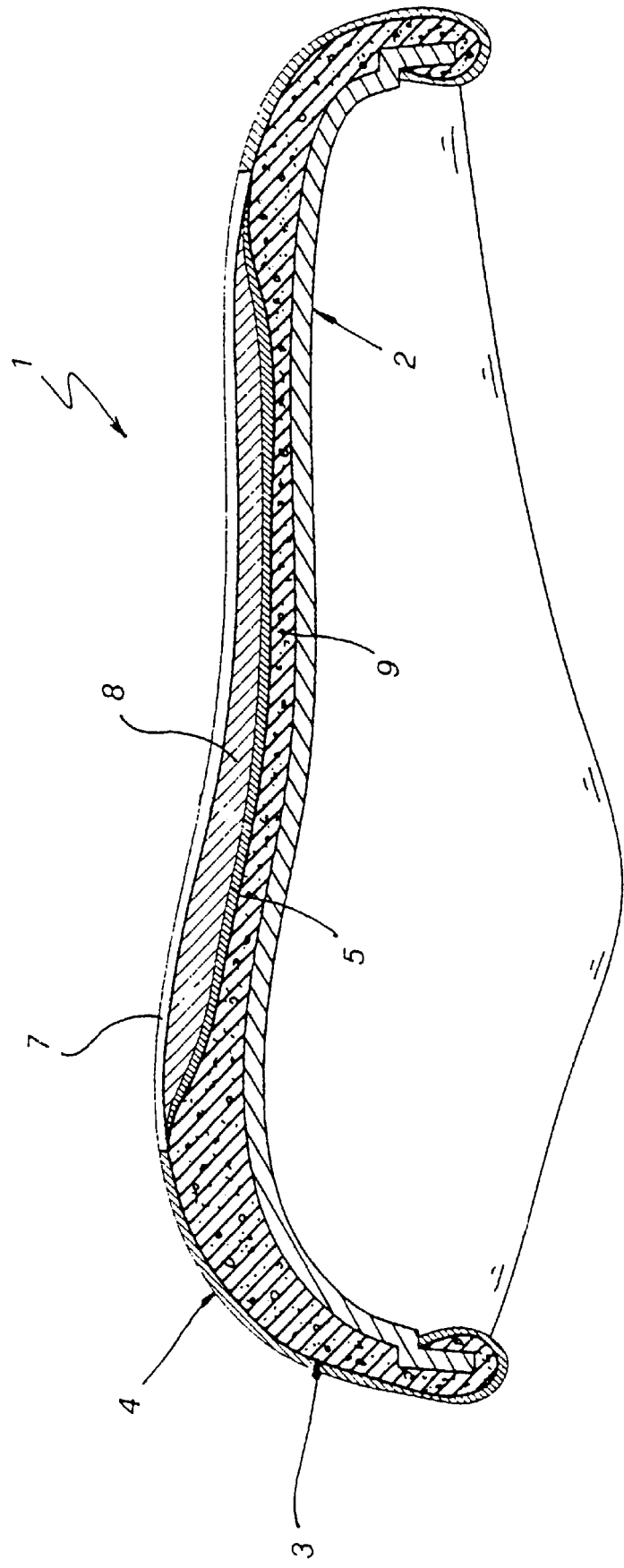
FIG. 3 illustrates a sectional view of the support of FIG. 2 according to the plane III—III.

With reference to the FIGS. 1 to 3 there is illustrated an integral elastic support, for example consisting of a seat for bicycles, identified globally with the reference numeral 1.

The support 1 comprises a shell 2 with bracket for fixation to the frame of the bicycle, in rigid or semirigid plastic material of the nylon or similar type, upon which there is anchored a filler 3 of elastically yielding material covered by a covering layer 4 in flexible laminar material.

In the filler 3 there is inserted at least one ornamental element 5, preferably but not exclusively two-dimensional, constituted for example by a film of plastic material with designs and/or advertising writings 6 serigraphed and/or personalised, of any type and colorisation. Alternatively, there may be provided more ornamental elements, arranged side-by-side or variously disposed, or the ornamental element 5 may be an object of a certain thickness, for example an embossed stem or figurine.

Opportunely, the covering layer 4 has at least one optically transparent zone 7 overlapping at the corresponding ornamental element 5 in a manner to allow to see the latter from outside Opportunely, the filler 3 may be formed by a first upper layer 8 of a gel compound provided with an elastic memory and uniformly transparent, completely covered by the external covering layer 4 and partially overlapping at a second lower layer 9 of elastomeric foamed and elastically yielding material.

The mixing and the pouring of the compound in the mould should take place in particular conditions, as it will be described in detail hereinafter, in a manner such that after the polymerisation the product (i.e. particularly the upper layer 8 together with the zone 7) is perfectly transparent permitting the see the ornamental element 5 from outside.

The foamed elastomeric material may be a conventional polyurethane foamed resin and will be chemically bound both to the first gel compound filler layer 8 and to the covering layer 4.

Due to this structure, the elastic support will result in a single body having a great flexibility and comfort but also of notable aesthetic value and visibility of the ornamental elements, which will appear as through a "video" or a "monitor" created on the external covering of the support.

It is observed that the ornamental elements of the support may not be minimally scratched, worn or faded, since they are completely encapsulated and protected under a transparent layer of gel compound and under the transparent covering layer 4 in correspondence with the zone or zones 7, avoiding the drawbacks of the past cited in the introduction.

The method of manufacturing the integral elastic support according to the invention is essentially directed to inserting inside the filler layer at least one ornamental element and to predisposing a covering layer with at least one optically transparent zone through which it is possible to see the above-said ornamental element.

In a preferred form, the method of manufacturing the support according to the invention has numerous similarities with the method described and claimed in the Italian patent IT-A-1 270 728 and is different from the latter essentially for the preparation and pouring step of the gel compound and for the insertion of ornamental elements in the filler.

For manufacturing the support there is predisposed a tool formed by a lower female mould, with an upwardly open cavity reproducing the surface of the support destined for contact with the user, and by an upper closure plate.

On the bottom of the female mould there is consequently disposed a sheet of impermeable and flexible laminar material defining a covering layer 4.

The covering layer 4 is consequently preformed in a manner to reproduce the bottom of the cavity of the female mould, for example by means of aspiration under vacuum.

On the bottom of the preformed covering layer there is poured a gel compound adapted to define a first filler layer 8. Preferably, the gel, compound may be polyurethane based, for example of the known type with the commercial name LEVAGEL® of Bayer, obtainable from the mixing of polyols with isocyanates and described in detail in the U.S. Pat. Nos. 4,404,296 and 4,456,642.

Consequently there is poured an expandable resin in the fluid state, for example of the polyurethane type, adapted to define a second filler layer 9.

The female mould is finally hermetically closed with an upper plate in order to allow the expansion and the complete polymerisation of the resin and of the gel compound.

The method differs from the known one for the following aspects:

the covering layer 4 is prepared in a manner to have at least one optically transparent zone 7;

the gel compound defining the first filler layer is previously dehumidified and de-aerated in a manner to be completely transparent;

before the disposition of the second filler layer 9 on the first layer 8 of compound gel there is disposed at least one ornamental element 5 in a position substantially aligned with the optically transparent zone 7 of the covering layer, in a manner to render the ornamental element 5 visible from the outside.

To such end, the ornamental element may be constituted by a plastic film 5 bearing designs, trademarks, or personalised or advertising writings 6, or by a substantially three-dimensional element, such as a figurine or a frieze in low relief.

The optically transparent zone 7 of the covering layer 3 may be obtained starting from a base sheet of uniformly transparent synthetic material, for example a polyvinyl or polyurethane additive resin with plasticisers. Optimum results have been obtained with a PVC with k 70–80 and formulated with pure plasticisers of the type DOP and BBP and de-aerating the plastified material obtained for 6–8 hours at 74 mmHg before the spreading on release paper. The sheet may be consequently partially serigraphed or anyhow coloured with opaque pigmentation on all of the surface except in the zone 7 in a manner to form a "window" towards the inside aligned with the ornamental element 5. Obviously, instead of only one zone 7, there may be provided more zones 7 all of which are optically transparent, mutually distanced or partially overlapping on the external surface of the support and in any case aligned with corresponding ornamental elements 5.

Alternatively, the optically transparent zone 7 may be obtained starting with a base sheet of synthetic material, similar to that described above, but uniformly opaque, for example with a superficial embossed or in any case rough finish. The optically transparent zone 7 will be obtained by placing the uniformly opaque sheet in contact with a tool or electrode which is heated or subjected to electromagnetic waves in the radio frequency range, with preferably smooth and glossy contact surfaces.

The above cited gel compound is obtained by mixing of at least one first component A constituted by a polyol and at least one second component B constituted by an isocyanate.

Figure 4:
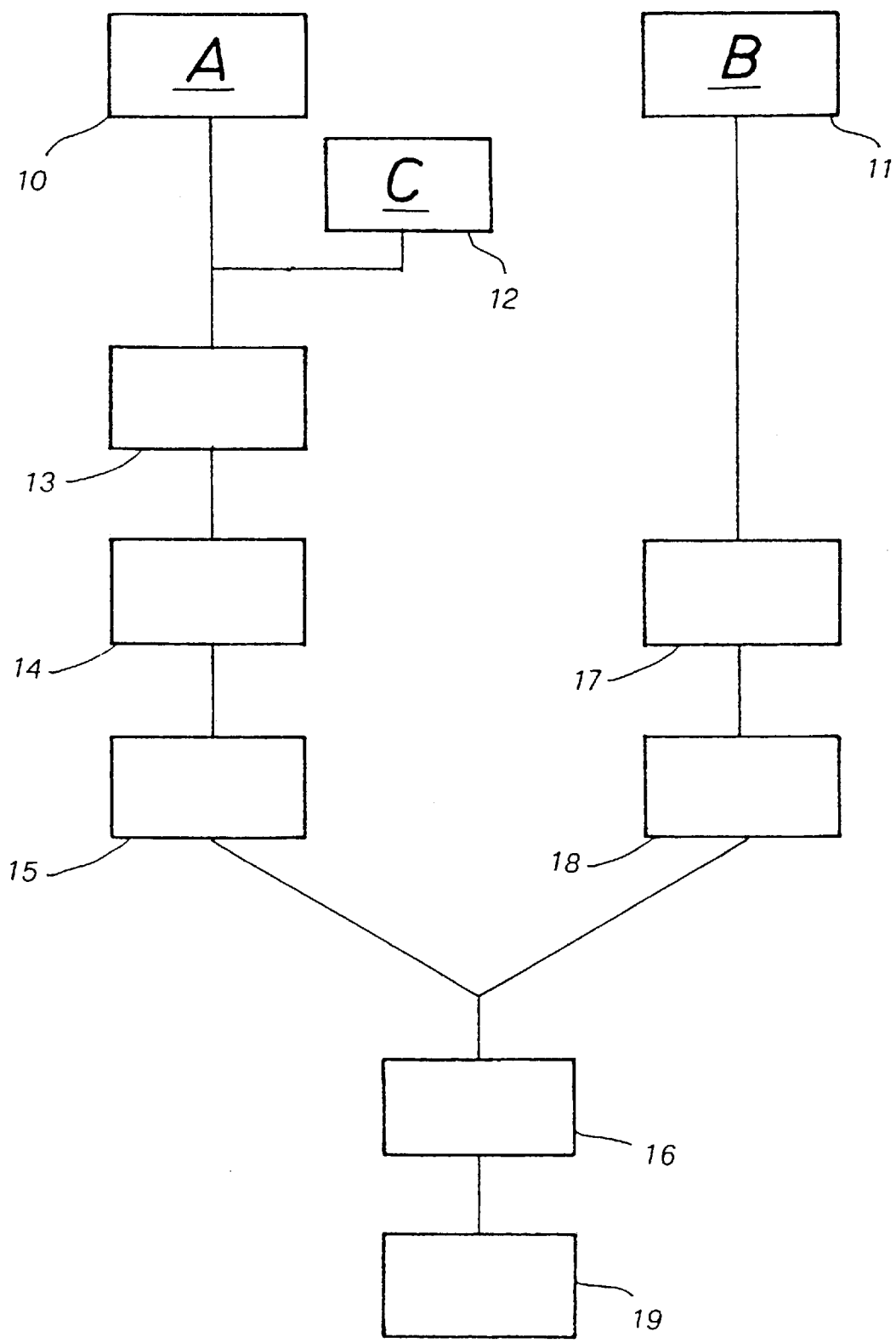
FIG. 4 illustrates a flow diagram of a method of manufacturing of the integral support of the type illustrated in the preceding figures according to one preferred aspect of the invention.

As it is illustrated clearly in the flow diagram of FIG. 4, both components A and B of the gel compound are stored under pressure by means of dehumidified air in respective storage tanks 10, 11 in order to avoid any kind of absorption of humidity which could cause expansion reactions and subsequent opalescence of the initial components.

Following the line of the component A, the polyol is admixed with a catalyst C by means of a closed circuit mixing system 12 in a manner to avoid incorporating air.

The storage in an intermediate tank 13 follows and subsequently the sending to a chamber of continuous degassing 14 by means of the application of vacuum and slow agitation for a predetermined time, which is preferably equal to about 24 hours.

From the degassing chamber 14 the polyol is drawn by means of an automatic level device to a feeding tank 15 of the foaming head 16.

The line of the component B provides for the transfer of the isocyanade to a degassing chamber 17 analogous to the chamber 14 of the poliol, with a continuous and slow agitation for about 24 hours. The degassed isocyanate is subsequently transferred to the feeding tank 18 of the foaming head 16.

Opportunely, the deposit or foaming head 16 has a very small mixing chamber, with a programmable progression mixing slope. The feeding nozzle of the compound has a rather small diameter, equal to about 4–6 mm, in order to avoid dripping at the end of the flow.

The length of the nozzle is also controlled for pouring the compound inside the mould avoiding the formation of vortexes and of air, and subsequently the opalescence of the gel.

Moreover, in order to always reduce the risk of incorporating air, the head is movable along a first substantially horizontal direction in order to carry out the pouring in movement.

Finally, the foaming head is movable along a second substantially vertical direction in order to reduce to a minimum the distance from the bottom of the cavity for each specific mould in a manner to avoid turbulence during the pouring.

To such end, the head is provided with a translation carriage and with a servomechanism 19 for the horizontal and vertical movement, maneuvered by hardware and software such as to render the movement time equal to the pouring time, carrying out the pouring with the head always in movement.

The integral elastic support according to the invention and the method for manufacturing the same are susceptible to numerous modifications and variations, all falling within the inventive concept expressed in the attached claims.

What is claimed is:

1. An integral elastic support structure with ornamental elements, comprising a filler covered by a covering layer, wherein said filler is made of elastically yielding material and has in its inside at least one ornamental element and wherein said covering layer is made of flexible laminar material and has at least one optically transparent zone through which said at least one ornamental element is visible, said filler comprising at least a first layer of uniformly transparent compound and a second layer of foamed material.

2. The integral elastic support structure according to claim 1, wherein said covering layer is formed by a sheet of uniformly transparent synthetic material.

3. The integral elastic support structure according to claim 2, wherein said uniformly transparent material is a polyurethane additive or polyvinyl resin with plasticisers.

4. The integral elastic support structure according to the claim 3, wherein said sheet of uniformly transparent material is partially colored or covered with an opaque pigmented layer in manner to leave at least one optically transparent zone.

5. The integral elastic support structure according to the claim 1, wherein said filler comprises at least one first layer of a uniformly transparent gel compound completely covered by the covering layer.

6. The integral elastic support structure according to the claim 5, wherein said gel compound is of the polyurethane type and is formed by a mix of polyols and of isocyanates.

7. The integral elastic support structure according to the claim 6, wherein said filler comprises a second layer of elastomeric foamed material at least partially covered by said first layer.

8. The integral elastic support structure according to the claim 7, wherein said elastomeric foamed material is a polyurethane resin.

9. The integral elastic support structure according to claim 8, wherein said at least one ornamental element is inserted between said first and said second filler layer in a position aligned with said at least one optically transparent zone of the covering layer.

10. The integral elastic support structure according to the claim 9, wherein said at least one ornamental element comprises a laminar film bearing designs or writings of various colorization.

11. The integral elastic support structure according to claim 1, wherein said first layer is completely covered by said covering layer.

12. The integral elastic support structure according to claim 1, wherein said second layer of elastomeric material is at least partially covered by said first layer.

13. A method for the manufacture of an elastic support with ornamental elements of the type having a filler of elastically yielding material covered by a covering layer in flexible laminar material, comprising the steps of:

inserting inside the filler at least one ornamental element; and providing on the covering layer at least one optically transparent zone through which said at least one ornamental element is visible.

14. The method according to the claim 13, comprising the steps of:

prepositioning of a tool formed by a lower female mold with an upwardly facing cavity reproducing the surface of the support destined for contact with the user and by an upper closure plate;

positioning on the bottom of the female mold of a sheet of impermeable and flexible laminar material defining a covering layer;

preforming the covering layer in a manner to reproduce the bottom of said cavity;

pouring on the bottom of said preformed covering layer a gel compound defining a first filler layer;

pouring on the partially polymerized gel compound of a second filler layer of an expandable resin in the fluid state;

hermetically closing the female mold with the upper plate for allowing the expansion and the complete polymerization of the resin and of the gel compound;

dehumidifying and de-aerating the gel compound in a manner to be completely transparent, and positioning at least one ornamental element on the first layer before the pouring of the second filler layer in a position which is substantially aligned with said at least one optically transparent zone of the covering layer.

15. The method according to the claim 14, wherein said gel compound is obtained by the mixing at least a first component constituted by a polyol and of at least one second component constituted by an isocyanate.

16. The method according to the claim 15, further comprising the step of storing both said components of the gel compound under pressure by means of dehumidified air.

17. The method according to the claim 15, comprising the step of admixing said polyol with a catalyst by means of a closed circuit mixing system in order to avoid incorporation of air.

18. The method according to the claim 15, comprising the steps of continuously degassing said components of the compound gel by applying a vacuum and slowly agitating the components in a tank for a predetermined time.

19. The method according to the claim 18, wherein said degassing time is about 24 hours.

20. The method according to the claim 19, comprising the steps of pouring the gel in a cavity of a female mold with a foaming head movable along a first substantially horizontal direction, pouring the gel while moving the head for avoiding incorporation of air.

21. The method according to the claim 20, comprising the step of moving the head for a time substantially equal to the movement time.

22. The method according to the claim 20, comprising steps of mounting the head on a carriage movable along a second substantially vertical direction for reducing to a minimum a distance from a bottom of the cavity for avoiding turbulence during the pouring.

23. The method according to the claim 13, comprising the step of providing an opacifying base sheet of uniformly transparent synthetic material in zones complementary to said optically transparent zone.

24. The method according to the claim 13, comprising the step of providing a shining sheet of uniformly opaque base material with a tool having a shape and dimension corresponding to that of said optically transparent zone.

25. A method for the manufacture of an elastic support with ornamental elements of the type having a filler covered by a covering layer, wherein said filler is made of elastically yielding material and wherein said covering layer is made of flexible laminar material, said filler comprising at least one first layer of uniformly transparent compound and a second layer of foamed material, comprising the steps of:

inserting at least one ornamental element inside the filler; and providing at least one optically transparent zone on the covering layer through which said at least one ornamental element is visible.

* * * * *